(12) United States Patent
Djakovic (10) Patent No.: US 12,072,931 B2
(45) Date of Patent: Aug. 27, 2024

(54) SYSTEM AND METHOD FOR STORING SEGMENTED VIDEO IN A DATABASE

(71) Applicant: Hubbell Incorporated, Shelton, CT (US)

(72) Inventor: Vladan Djakovic, San Francisco, CA (US)

(73) Assignee: Hubbell Incorporated, Shelton, CT (US)

( * ) Notice: Subject to any disclaimer, the term of this patent is extended or adjusted under 35 U.S.C. 154(b) by 556 days.

(21) Appl. No.: 16/724,583

(22) Filed: Dec. 23, 2019

(65) Prior Publication Data

US 2020/0226178 A1 Jul. 16, 2020

Related U.S. Application Data

(60) Provisional application No. 62/792,127, filed on Jan. 14, 2019.

(51) Int. Cl.
*G06F 16/71* (2019.01)
*G06F 16/23* (2019.01)
(Continued)

(52) U.S. Cl.
CPC .......... *G06F 16/71* (2019.01); *G06F 16/2365* (2019.01); *G06F 16/7867* (2019.01);
(Continued)

(58) Field of Classification Search
CPC .. G06F 16/71; G06F 16/2365; G06F 16/7867; H04L 65/601; H04L 65/607; H04N 21/4223; H04N 21/845; H04N 5/76; H04N 7/18; H04N 21/23109; H04N 21/23113; H04N 21/8456
(Continued)

(56) References Cited

U.S. PATENT DOCUMENTS 9,130,902 B2 * 9/2015 Kuehl ................... H04L 47/125
10,158,907 B1 12/2018 Wang et al.
(Continued)

FOREIGN PATENT DOCUMENTS

JP 6249569 B2 12/2017

OTHER PUBLICATIONS

Djakovic, Vladan; Camera Switch>Message Board, Video Transports, accessed on Oct. 12, 2017, https://3.basecamp.com/3499241/buckets/3647542/messages/7245 . . . —4 pages.
(Continued)

*Primary Examiner* — Giovanna B Colan
(74) *Attorney, Agent, or Firm* — Robinson & Cole LLP (57) ABSTRACT

A method of storing segmented video in a database is provided. The method includes obtaining, by one or more computing devices, data indicative of a segment of a video captured by a camera. The method includes storing, by the one or more computing devices, the data indicative of the segment as a record in the database. The method includes determining, by the one or more computing devices, the record has expired based, at least in part, on a timestamp associated with the record. The method includes modifying, by the one or more computing devices, the record in response to determining the record has expired.

20 Claims, 10 Drawing Sheets

(51) Int. Cl.
*G06F 16/78* (2019.01)
*H04L 65/75* (2022.01)
*H04N 21/4223* (2011.01)
*H04N 21/845* (2011.01)

(52) U.S. Cl.
CPC ......... *H04L 65/75* (2022.05); *H04N 21/4223* (2013.01); *H04N 21/845* (2013.01)

(58) Field of Classification Search
USPC .............. 707/689, 722; 345/633; 726/29, 12
See application file for complete search history.

(56) References Cited

U.S. PATENT DOCUMENTS

| | | | | |
|---|---|---|---|---|
| 10,382,512 | B2 * | 8/2019 | Bomfim | H04N 21/23608 |
| 11,151,192 | B1 * | 10/2021 | Campbell | G06V 20/58 |
| 11,250,054 | B1 * | 2/2022 | Campbell | G06V 20/588 |
| 2003/0053792 | A1 * | 3/2003 | Janevski | H04N 5/76 |
| | | | | 386/229 |
| 2003/0225696 | A1 | 12/2003 | Niwa | |
| 2005/0177859 | A1 | 8/2005 | Valentino, III et al. | |
| 2006/0195876 | A1 | 8/2006 | Calisa | |
| 2007/0150138 | A1 * | 6/2007 | Plante | H04N 21/44004 |
| | | | | 701/33.4 |
| 2014/0331139 | A1 | 11/2014 | Carson et al. | |
| 2017/0070780 | A1 * | 3/2017 | Smith | H04N 5/04 |
| 2018/0007421 | A1 * | 1/2018 | Yoo | H04N 21/4622 |
| 2019/0114413 | A1 * | 4/2019 | Ozaki | H04N 21/43615 |
| 2019/0370544 | A1 * | 12/2019 | Wright, Jr. | G06Q 10/20 |

OTHER PUBLICATIONS

International Search Report and Written Opinion issued on Mar. 3, 2020, by the International Searching Authority in corresponding International Patent Application No. PCT/US2019/068237. (8 pages).

* cited by examiner

| CSID 310 | Authorization Key 320 |

SYSTEM AND METHOD FOR STORING SEGMENTED VIDEO IN A DATABASE

PRIORITY CLAIM

The present application claims the benefit of priority of U.S. Provisional App. No. 62/792,127, titled "System and Method for Storing Segmented Video in a Database," having a filing date of Jan. 14, 2019, which is incorporated by reference herein.

FIELD

The present disclosure relates generally to video streaming and, more particularly, methods for storing segmented video in a database.

BACKGROUND

Databases can be used to store a variety of data. For instance, databases can be used to store video data obtained from one or more image capture devices. However, databases have a finite storage capacity. As such, maintenance must be performed on databases from time to time to remove data that no longer needs to be stored on the database. However, performing maintenance on databases can be burdensome.

SUMMARY

Aspects and advantages of embodiments of the present disclosure will be set forth in part in the following description, or may be learned from the description, or may be learned through practice of the embodiments.

In one aspect, a method of storing segmented video in a database is provided. The method includes obtaining, by one or more computing devices, data indicative of a segment of a video captured by a camera. The method includes storing, by the one or more computing devices, the data as a record in the database. The method includes determining, by the one or more computing devices, the record is expired based, at least in part, on a timestamp associated with the record. The method includes modifying, by the one or more computing devices, the record in response to determining the record is expired.

In another aspect, a system for storing segmented video in a database is provided. The system includes a camera and one or more computing devices communicatively coupled to the camera. The one or more computing devices can be configured to obtain data indicative of a segment of a video captured by the camera. The one or more computing devices can be further configured to store the data indicative of the segment as a record in the database. The one or more computing devices can be even further configured to determine the record has expired based, at least in part, on a timestamp indicative of when the record was created. Furthermore, in response to determine the record has expired, the one or more computing devices can be configured to modify the record.

In yet another aspect, a computer readable medium that includes computer readable instructions for carrying out a method of storing segmented video in a database is provided. The method can include obtaining, by one or more computing devices, data indicative of a segment of a video captured by a camera. The method can include storing, by the one or more computing devices, the data indicative of the segment as a record in the database. Furthermore, in response to determining the record has expired, the method can include modifying, by the one or more computing devices, the record.

Other examples aspects of the present disclosure are directed to apparatus, methods, electronic devices, non-transitory computer-readable media, and systems.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a system for storing segmented video in a database. In some implementations, the system can include a camera configured to capture video. The camera can include one or more computing devices. The one or more computing devices can be configured to compress the video using any suitable video compression algorithm. In some implementations, the one or more computing devices can be configured to parse the video into a plurality of segments. It should be appreciated, however, that the one or more computing devices can be configured to parse the video such that each segment of the plurality of segments spans any suitable amount of time. For instance, in some implementations, the one or more computing devices can be configured to parse the video such that each segment of the plurality of segments spans about 2 seconds. In alternative implementations, the one or more computing devices can be configured to parse the video such that each segment of the plurality of segments spans about 10 seconds.

In some implementations, the camera can be required to obtain a token to establish communications with a server of the system. For instance, the camera can be configured to provide a data packet to the server to obtain the token. The data packet can include a cloud storage identification (CSID) that uniquely identifies the camera. In some implementations, the camera can be configured to generate the CSID based, at least in part, on a human-readable content name assigned to the camera via a user. For instance, the human-readable content name can be established during installation of the camera.

In some implementations, the data packet can include an authorization key (e.g., coin, Proof of Work (POW), derived coin, etc.). The authorization key can allow the camera to write data to a database implemented by the server and/or read data from the database. In some implementations, the data packet can be encrypted with a public key associated with the server. Alternatively or additionally, the camera can be configured to communicate the data packet over the one or more networks to the server using any suitable communications protocol (e.g., UDP).

In some implementations, the server can include one or more computing devices. The one or more computing devices of the server can be configured to issue a token to the camera based, at least in part, on the data packet received from the camera. For instance, the one or more computing devices can be configured to determine whether the authorization key included in the payload of the data packet is valid. If the one or more computing devices determine the authorization key is valid, the one or more computing devices can communicate a data packet to the camera. The data packet can include the token that permits the camera to write data to the database implemented on the server and/or read data stored on the database. In some implementations, the data packet that includes the token can be encrypted. It should be appreciated that the data packet can be encrypted using any suitable encryption method. For instance, the data packet can be encrypted based, at least in part, on the data packet that includes the token.

In some implementations, the token provided to the camera can be valid for a predetermined amount of time. For example, the token may only be valid for twenty-four hours. It should be appreciated, however, that the token can be valid for any suitable amount of time. For instance, in some implementations, the token can be valid for greater than twenty-four hours. In alternative implementations, however, the toke can be valid for less than twenty-four hours.

In some implementations, the camera can provide a data packet to the server subsequent to obtaining the token from server. More specifically, the camera can provide the data packet to the server to write one or more segments of the video captured by the camera to the database. It should be appreciated that the data packet can include a header and a payload.

In some implementations, the header can include a variable indicative of whether the camera requests the server acknowledge receipt of the data packet. For instance, if the variable has a first value (e.g., a "C"), the server can be configured to provide an acknowledgement packet to the camera to indicate receipt of the data packet. Conversely, if the variable has a second value (e.g., a "P"), an acknowledge packet will not be provided. Alternatively or additionally, the data packet the camera provides to the server can include a cloud record key (CRK). In some implementations, the CRK can include the CSID which, as mentioned above is unique to the camera. In addition, the CRK can include a unique record identification (URID).

In some implementations, the header of the data packet can include the token previously issued to the camera. Alternatively or additionally, the header can include a timestamp indicative of when the data packet was generated. It should be appreciated, however, that the header of the data packet can include any suitable combination of the variable, CRK, token, and timestamp indicative of when the data packet was generated.

In some implementations, the payload of the data packet can include one or more segments of the video captured via the camera. It should be appreciated that the camera can be configured to communicate the data packet to the server using any suitable communication protocol. For instance, in some implementations, the camera can be configured to communicate the data packet using a hyper-text transfer protocol (HTTP) based media protocol, such as HTTP live streaming (HLS). As will be discussed below in more detail, the plurality of segments of video data can be stored as a record in the database.

In some implementations, the one or more computing devices of the server can be configured to implement a database engine. When the one or more computing devices execute the database engine, the one or more computing devices can be configured to store segments of the video as a record in the database. It should be appreciated that one segment can be provided to the server via a plurality of data packets, such as the data packets discussed above that the camera sends the server subsequent to obtaining the token needed to authenticate communication between the two devices.

In some implementations, the database can include a directory space and a segment space, both of which are specific to the camera. The directory space can include a plurality of slots (e.g., 2048 slots). For instance, the plurality of slots can span from URID 0 to URID 2047. It should be appreciated, however, that the directory space can include more or fewer slots. The segment space can begin after the directory space. For instance, the segment space can begin at URID 2048 and include all available slots thereafter (e.g., up to URID $2^{24}-1$).

In some implementations, each directory entry can include an over-writeable record describing a plurality of segments of a continuous segment group (CSG). The record can include a header. In some implementations, the header can include a variable (e.g., a flag) indicative of whether the record is complete or live. Alternatively or additionally, the header can include the number of segments included in the record. For instance, in some implementations, the CSG can include up to 156 individual segments. As discussed above, each segment of the plurality of segments can be stored as a record in the segment space of the database.

In some implementations, each segment of the plurality of segments included in the CSG can include the URID (e.g., address) of the oldest (e.g., first recorded) segment included in the CSG. In addition, each segment can include the timestamp associated with the initial frame of the oldest segment. In this manner, each segment can reference back to the initial frame of the oldest segment included in the CSG.

In some implementations, directory entries can be retained in the database for a predetermined amount of time (e.g., 4 hours). As such, a directory entry that has been retained in the database for greater than the predetermined amount of time can be overwritten with a new directory entry. In some implementations, the one or more computing devices of the server can be configured to write the new directory entry into the first available slot in the directory space of the database. In alternative implementations, the header associated with each directory entry included in the database can include a variable indicative of a status (e.g., available vs. occupied) of each slot in the directory space is available. In this manner, use of the variable in the header can eliminate reads of non-existent records.

In some implementations, a user can manipulate a user device (e.g., smartphone, tablet, laptop, etc.) to request playback of the video captured by the camera. For instance, the user can demand playback starting from a particular segment of the video. In some implementations, the demanded starting point for playback of the video may not correspond to the most recent segment of the video. In such implementations, the one or more computing device can be configured to obtain a segment corresponding to the requested starting point along with one or more additional segments occurring after the segment corresponding to the demanded starting point. In this manner, the user device can request to playback the video from any desired starting point.

In some implementations, the segment requested by the user can correspond to the most recent segment of the video. In such implementations, the one or more computing devices can be configured to obtain the most recent segment (e.g., live segment) and additional segments captured by the video and stored as the record in the database.

The system according to example aspects of the present disclosure provides numerous technical benefits. For instance, auto-expiring records eliminates the need for performing maintenance (e.g., defragmenting, purging, etc.) on the database. In addition, use of CSIDs to identify a source providing segmented video eliminates the need for the source (e.g., camera) to communicate with the database server to obtain keys to authenticate communication between the source and the sever. In this manner, the system of the present disclosure is well-suited for large numbers of users accessing records with limited lifespan, such as Internet of Things (IOT) devices.

Figure 1:
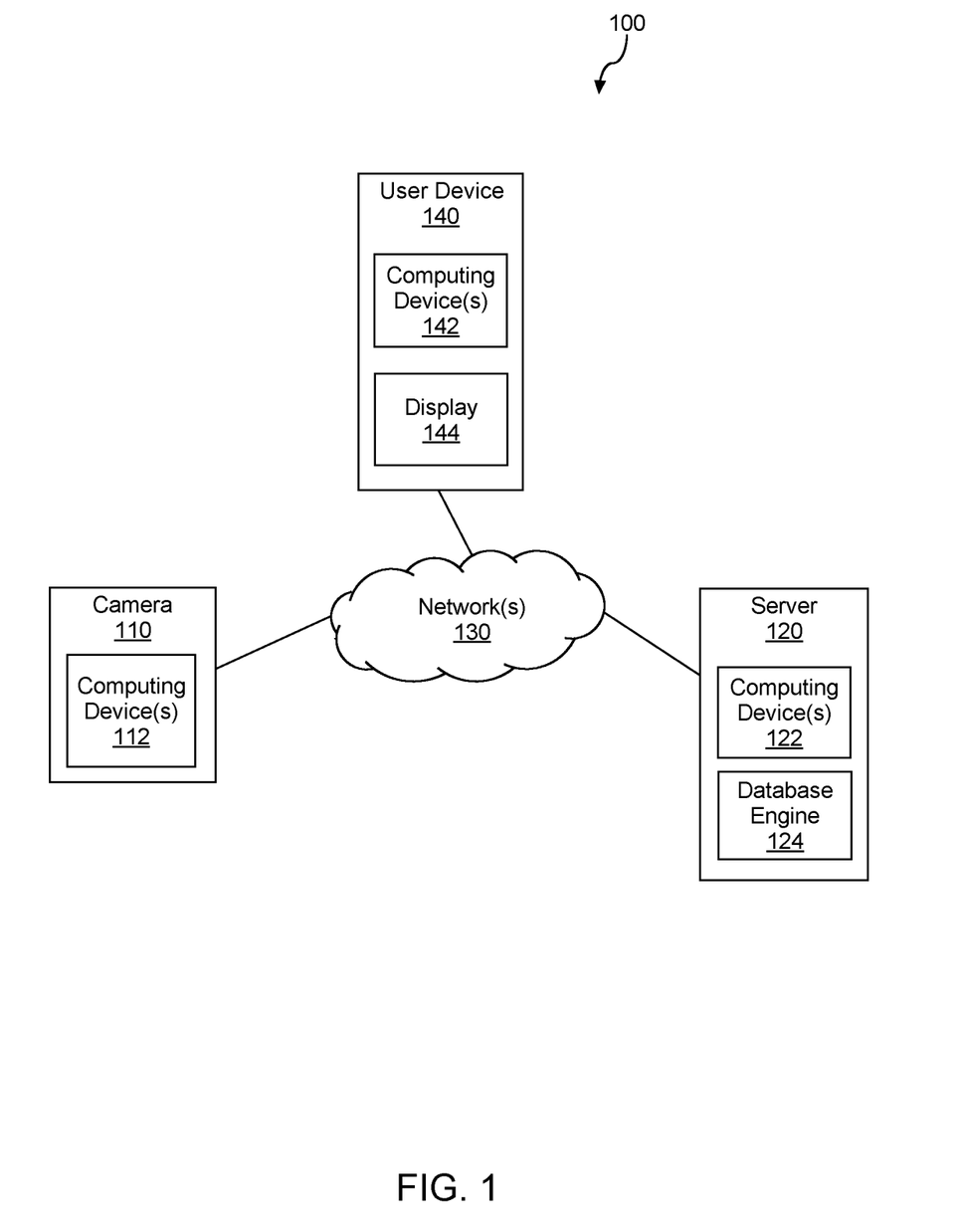
FIG. 1 depicts a schematic of a system for streaming video according to example embodiments of the present disclosure.

Referring now to the FIGS., FIG. 1 depicts a system 100 for streaming video according to example embodiments. As shown, the system 100 can include a camera 110. It should be appreciated, however, that the system 100 can include any suitable number of cameras 110. As shown, the camera 110 can include one or more computing devices 112. The one or more computing devices 112 can be configured to process video captured via the camera 110. For instance, the one or more computing devices 112 can be configured to compress the video using any suitable video compression algorithm. Alternatively or additionally, the one or more computing devices can be configured to parse the video into a plurality of segments.

It should be appreciated, however, that the one or more computing devices 112 of the camera 110 can be configured to parse the video such that each segment of the plurality of segments spans any suitable amount of time. For instance, in some implementations, the one or more computing devices can be configured to parse the video such that each segment of the plurality of segments spans about 2 seconds. In alternative implementations, the one or more computing devices can be configured to parse the video such that each segment of the plurality of segments spans about 10 seconds.

In some implementations, the system 100 can include a server 120 that is communicatively coupled with the camera 110. For instance, the server 120 can be communicatively coupled with the camera 110 over one or more networks 130. Alternatively, the server 120 can be in direct communication with the camera 110. When the server 120 is communicatively coupled to the camera 110, the server 120 can obtain data (e.g., segmented video) from the camera 110.

It should be appreciated that the one or more networks 130 can include any suitable type of network, such as a local area network (e.g., intranet), a wide area network (e.g., internet), a low power wireless network (e.g., Bluetooth Low Energy (BLE), Zigbee, etc.), cellular network, or some combination thereof and can include any number of wired or wireless links. In general, communication over the one or more networks 130 can be implemented via any type of wired or wireless connection, using a wide variety of communication protocols (e.g., TCP/IP, HTTP, SMTP, FTP), encodings or formats (e.g., HTML, XML, HLS), and/or protection schemes (e.g., VPN, secure HTTP, SSL).

Examples of communication protocols can include, for instance, Bluetooth low energy, Bluetooth mesh networking, near-field communication, Wi-Fi (e.g., IEEE, 802.11), Wi-Fi Direct (for peer-to-peer communication), Z-Wave, Zigbee, Halow, cellular communication, LTE, or low-power wide area networking. Other suitable wired and/or wireless communication protocols can be used without deviating from the scope of the present disclosure.

In some implementations, the server 120 can include one or more computing devices 122 configured to implement a database engine 124. The one or more computing devices 122 can, when executing the database engine 124, be configured to store segments of the video in a database implemented by the server 120. As will be discussed below in more detail, the segments of the video can be stored as an over-writeable record in the database.

In some implementations, the system 100 can include a plurality of user devices 140 (only one shown) communicatively coupled to the server 120 via the one or more networks 130. Example user devices 140 can include, without limitation, smartphones, tablets (e.g., iPad, Microsoft Surface Pro, etc.), laptop computers, or desktop computers. As shown, each user device of the plurality of user devices 140 can include one or more computing devices 142. The one or more computing device(s) 142 can be configured to implement an application (e.g., mobile app, web-based app) to allow a user to stream the video captured via the camera 110. For instance, in some implementations, the video can be displayed via a display device 144, such as a LCD display.

In some implementations, the user can manipulate the user device 140 to request playback of the video starting from a particular segment of the video. It should be appreciated that, in some implementations, the demanded starting point for playback of the video may not correspond to the most recent segment of the video. In such implementations, the one or more computing device 122 of the server 120 can be configured to obtain a segment corresponding to the demanded starting point along with one or more additional segments occurring after the segment corresponding to the demanded starting point. In this manner, the user can request playback of the video from any desired starting point.

Figure 2:
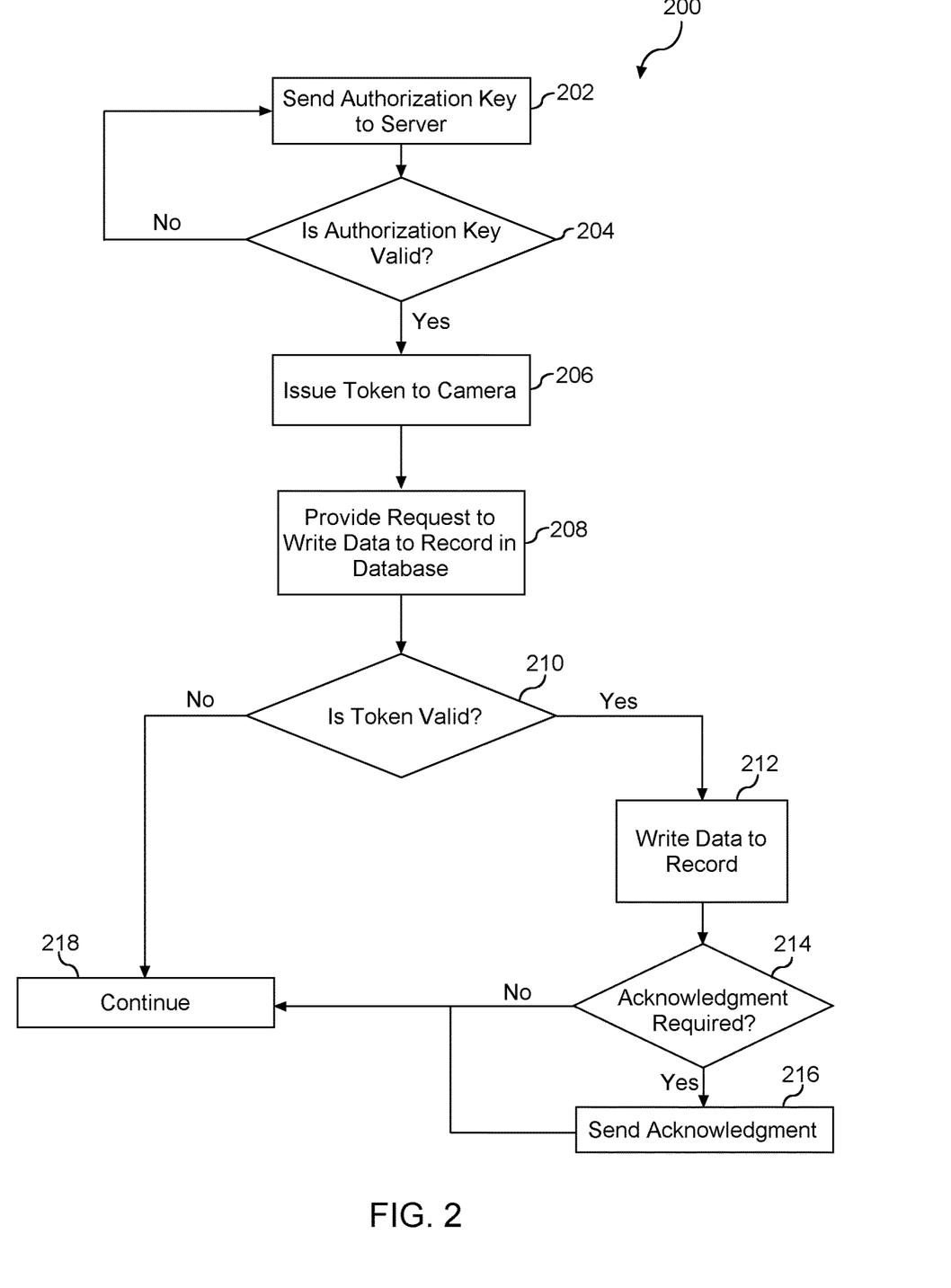
FIG. 2 depicts a flow diagram of a method for authenticating communications between a camera of the system of FIG. 1 and a server of the system of FIG. 1 according to example embodiments of the present disclosure.

Referring now to FIG. 2, a flow diagram of a method 200 for authenticating communications between a camera and a server is provided according to example embodiments of the present disclosure. It should be appreciated that the method 200 can be implemented using the system discussed above with reference to FIG. 1. FIG. 2 depicts steps performed in a particular order for purposes of illustration and discussion. Those of ordinary skill in the art, using the disclosures provided herein, will understand that various steps of the method 200 may be adapted, modified, rearranged, performed simultaneously or modified in various ways without deviating from the scope of the present disclosure.

Figure 3:
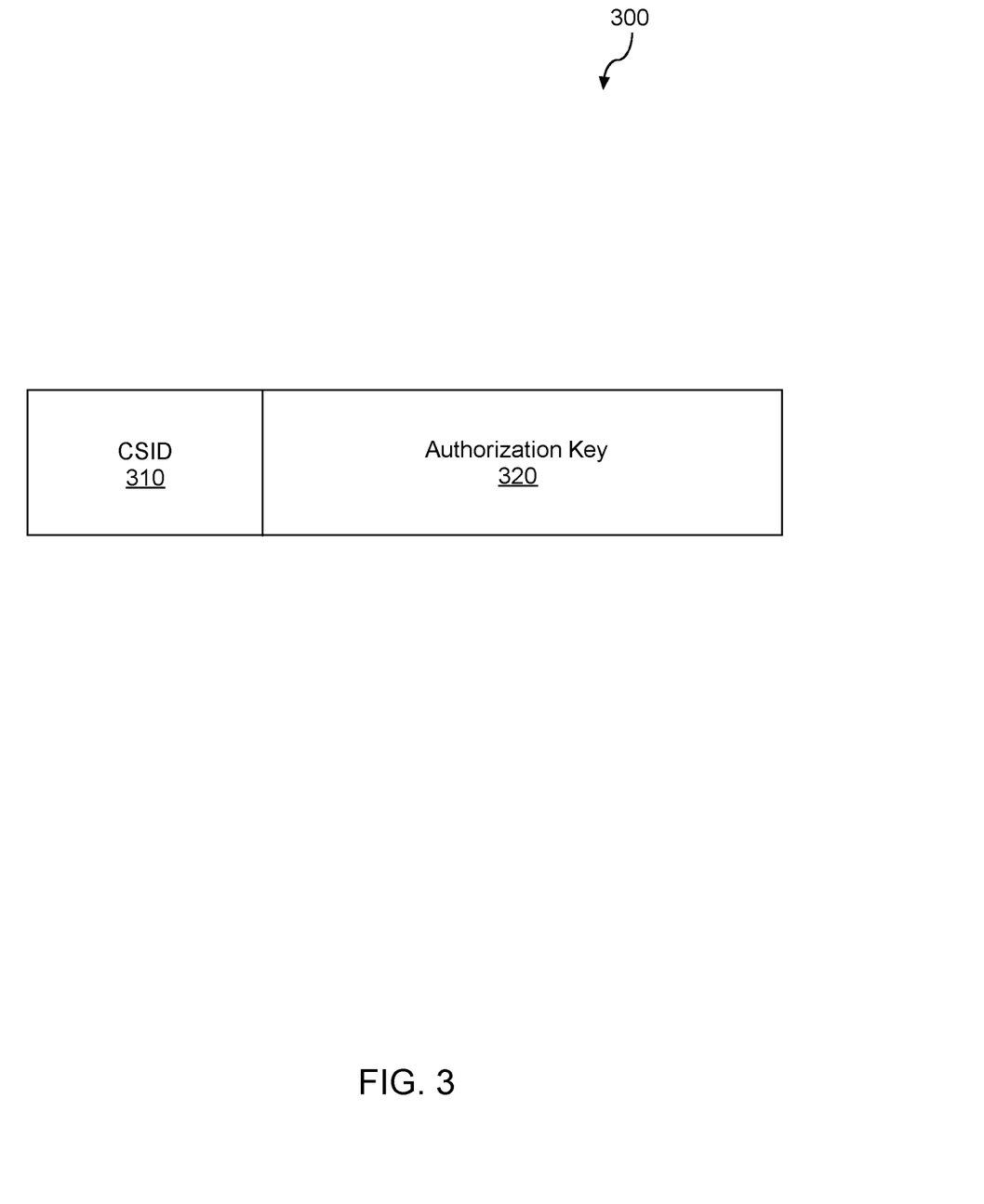
FIG. 3 depicts an example data packet according to example embodiments of the present disclosure.

At (202), the method 200 can include sending a token request to the server. For instance, the one or more computing devices of the camera can generate a data packet indicative of a request for a token that is needed to authenticate communications between the camera and the server. Referring briefly now to FIG. 3, an example data packet 300 associated with the request for a token is provided according to example embodiments of the present disclosure. As shown, the data packet 300 can include a CSID 310 generated based, at least in part, on a human-readable content name assigned to the camera via a user. In some implementations, the one or more computing devices of the camera can be configured to implement a hash function to generate the CSID 310. It should be appreciated that the CSID 310 is unique to the camera. As such, it should be appreciated that no two cameras included in the system can have the same CSID 310. As shown, the data packet 300 can further include an authorization key 320. Examples of the authorization key 320 can include, without limitation, a coin, a Proof of Work (POW), or any other suitable type of key or code that can be used to authenticate communications between the camera 110 and the server 120.

In some implementations, the authorization key 320 can allow the camera to write data to a database implemented by the server. In alternative implementations, the authorization key 320 can allow the camera to read data from the database. In still other implementations, the authorization key 320 can allow the camera to write data to the database and read data from the data base. It should be appreciated that the data packet 300 can, in some implementations, be encrypted with a public key associated with the server. Alternatively or additionally, the camera can be configured to communicate the data packet 300 over one or more networks to the server using any suitable communications protocol. For instance, the camera can be configured to communicate the data packet 300 over the one or more networks using a user datagram protocol (UDP).

Referring again to FIG. 2, the method 200 can include, at (204), determining, by one or more computing devices of the server, whether the authorization key 320 (FIG. 3) included in the data packet 300 (FIG. 3) the camera communicates to the server at (202) is valid. In some implementations, the one or more computing devices can be configured to compare the authorization key 320 against a plurality of authorization keys stored in a lookup table. It should be appreciated that each authorization key of the plurality of authorization keys included in the lookup table can be associated with a corresponding IoT device, such as the camera. If the server (e.g., one or more computing devices thereof) determines the authorization key 320 corresponds to one of the authorization keys included in the lookup table, the method 200 proceeds to (206). Otherwise, the method 200 reverts to (202).

Figure 4:
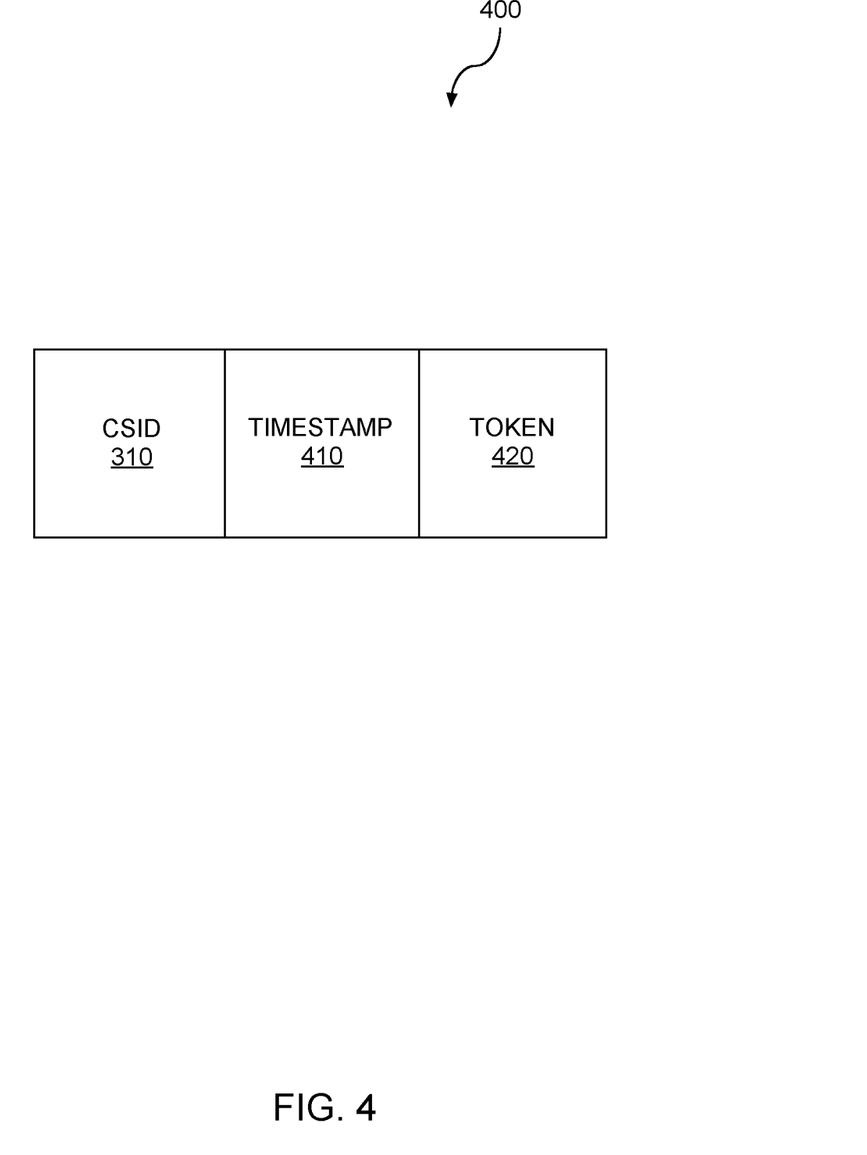
FIG. 4 depicts another example data packet according to example embodiments of the present disclosure.

At (206), the method 200 includes providing, by the one or more computing devices, a token to the camera. In some implementations, the token can be included in a data packet the server sends to the camera. Referring briefly now to FIG. 4, an example data packet 400 the server provides to the camera is provided according to example embodiments of the present disclosure. As shown, the data packet 400 can include the CSID 310 associated with the camera and the token 420 generated by the server. In some implementations, the data packet 400 can further include a timestamp 410 indicative of when the server communicated the data packet 400 to the camera. Finally, the data packet 400 can include data indicative of the token 420.

Figure 5:
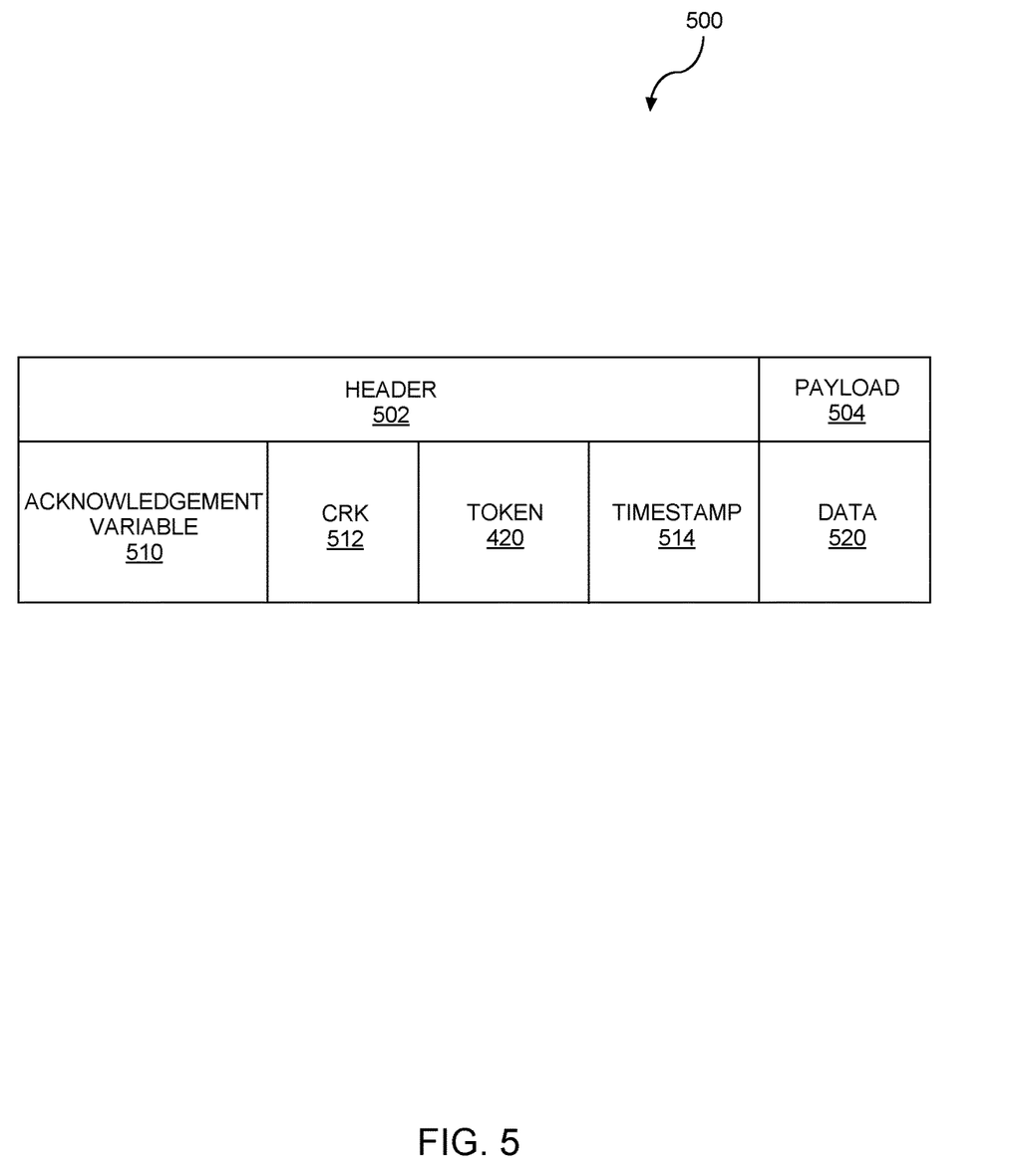
FIG. 5 depicts yet another example data packet according to example embodiments of the present disclosure.

Referring again to the FIG. 2, the method 200 can include, at (208), providing a request to write data to a record in the database implemented on the server. In some implementations, the request to write data to the record in the database can be associated with a data packet the camera sends to the server. Referring briefly now to FIG. 5, an example data packet 500 the camera sends to the server is provided according to example embodiments of the present disclosure. As shown, the data packet 500 can include a header 502 and a payload 504.

In some implementations, the header 502 can include an acknowledgement variable 510. The acknowledgement variable 510 can indicate whether the camera requests the server acknowledge receipt of the data packet 500. For instance, if the acknowledgement variable 510 has a first value (e.g., a "C"), the server can be configured to provide an acknowledgement packet to the camera to indicate receipt of the data packet. Conversely, if the variable has a second value (e.g., a "P"), no acknowledge packet will be provided to the camera.

In some implementations, the header 502 can include a cloud record key (CRK) 512. The CRK 512 can include the CSID 310 (FIGS. 3 and 4) which, as mentioned above is unique to the camera. In addition, the CRK 512 can include a unique record identification (URID). As will be discussed below in more detail, the URID can identify a location (e.g., address of memory element) within the database implemented by the server.

In some implementations, the header of the data packet can include the token 420 the server previously issued to the camera. Alternatively or additionally, the header 502 can include a timestamp 514 indicative of when the data packet was generated. It should be appreciated, however, that the header 502 of the data packet 500 can include any suitable combination of the acknowledgement variable 510, the CRK 512, the token 420, and the timestamp 514.

In some implementations, the payload 504 of the data packet 500 can include data 520 indicative of one or more segments of video captured via the camera. It should be appreciated that the camera can be configured to communicate the data packet to the server using any suitable communication protocol. For instance, in some implementations, the camera can be configured to communicate the data packet using a hyper-text transfer protocol (HTTP) based media protocol, such as HTTP live streaming (HLS).

Referring again to FIG. 2, the method 200 can include, at (210), determining whether the token issued at (206) remains valid. If the token is no longer valid, the server can ignore the write request received at (208) and proceed to (218). Otherwise, the method 200 can proceed to (212).

At (212), the method 200 can include storing, by the one or more computing devices, the data packet 500 (FIG. 5) received as part of the write request at (208). In some implementations, a portion of the data packet 500 can be provided to the database. For instance, the CRK 512 (FIG.

5), timestamp 514 (FIG. 5) and payload 504 of the data packet 500 can be stored in the database as an over-writeable record.

At (214), the method 200 can include determining whether receipt of the data packet 500 (FIG. 5) provided to the server at (208) needs to be acknowledged. For instance, the one or more computing devices of the server can be configured to determine whether receipt of the data packet 500 needs to be acknowledged based, at least in part, on the acknowledgment variable 510 included in the header 502 of the data packet 500. If the acknowledgement variable 510 (FIG. 5) indicates the camera requests acknowledgement of receipt of the data packet 500, the method 200 can proceed to (216). Otherwise, the method 200 can proceed to (218).

At (216), the method 200 includes providing, by one or more computing devices, an acknowledgment packet to the camera. In example embodiments, the acknowledgement packet can include the CRK 512 (FIG. 5) and a timestamp indicative of when the acknowledgement packet was generated.

Figure 6:
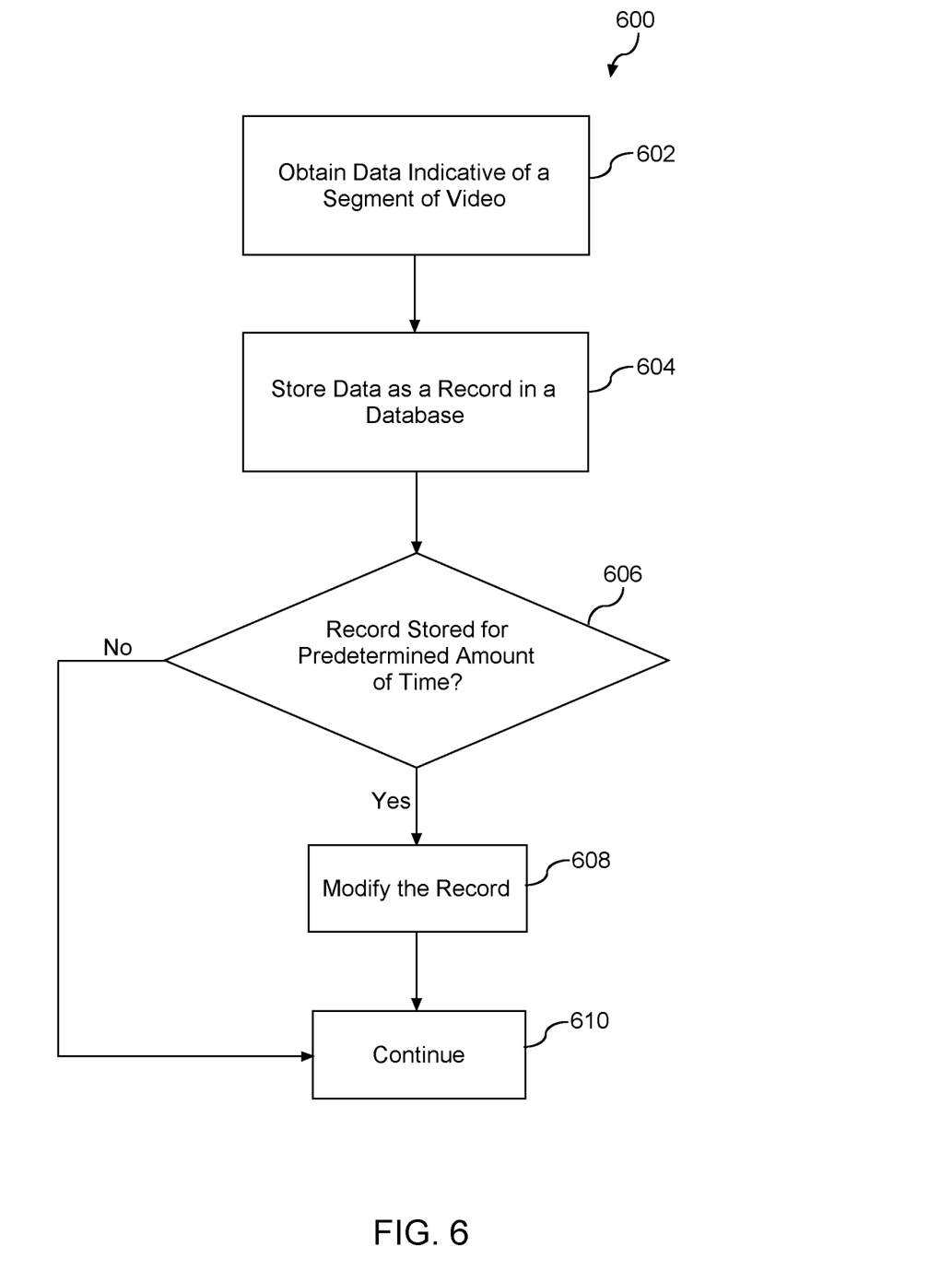
FIG. 6 depicts a flow diagram of a method for storing video data in a database according to example embodiments of the present disclosure.

Referring now to FIG. 6, a flow diagram of a method 600 for storing segmented video in a database is provided according to example embodiments of the present disclosure. It should be appreciated that the method 600 can be implemented using the system discussed above with reference to FIG. 1. FIG. 6 depicts steps performed in a particular order for purposes of illustration and discussion. Those of ordinary skill in the art, using the disclosures provided herein, will understand that various steps of the method 600 may be adapted, modified, rearranged, performed simultaneously or modified in various ways without deviating from the scope of the present disclosure.

At (602), the method 600 includes obtaining, by one or more computing devices, data indicative of a segment of video captured by a camera. In some implementations, the data indicative of the segment can include a plurality of video frames (e.g., I-frames, P-frames, B-frames, etc.) captured via the camera. It should be appreciated that the segment of video can be any suitable length. For instance, the segment can correspond to between about 2 seconds and about 10 seconds of video.

At (604), the method 600 includes storing, by the one or more computing devices, the data obtained at (602) as a record in a database implemented by the server. In some implementations, the data can include a continuous segment group (CSG) that includes a plurality of segments of video data. In such implementations, storing the data obtained at (602) can include storing data indicative of the CSG as a record in the database. In addition, storing the data obtained at (602) can include storing data indicative of each segment of the plurality of segments included in the CSG as a record in the database. In this manner, the database can include a record indicative of the CSG and a record indicative of each segment included in the CSG.

At (606), the method 600 includes determining, by the one or more computing devices, whether the record has been stored for a predetermined amount of time. It should be appreciated that the predetermined amount of time can correspond to any suitable amount of time. For instance, in some implementations, the predetermined amount of time can correspond to about four hours. It should also be appreciated that a timestamp indicating when the record was created can be used to determine whether the record has been storing the data obtained at (602) for greater than the predetermined amount of time. If the one or more computing devices determine the record has been storing the data obtained at (602) for greater than the predetermined amount of time, the method 600 proceeds to (608). Otherwise, the method 600 process to (610).

At (608), the method 600 includes modifying the record stored in the database. For instance, in some implementations, modifying the record can include setting a flag associated with the record to indicate that the record can be overwritten. Alternatively, modifying the record can include overwriting the record with another segment of the video captured via the camera. In this manner, maintenance actions performed on conventional databases do not need to be performed on the database of the present disclosure.

At (610), the method 600 continues. For instance, in some implementations, the one or more computing devices can be configured to perform step (606) at predetermined intervals of time. As an example, the one or more computing devices can be configured to determine perform step (606) once every hour. It should be appreciated, however, that the one or more computing devices can be configured to perform step (606) more or less often.

Figure 7:
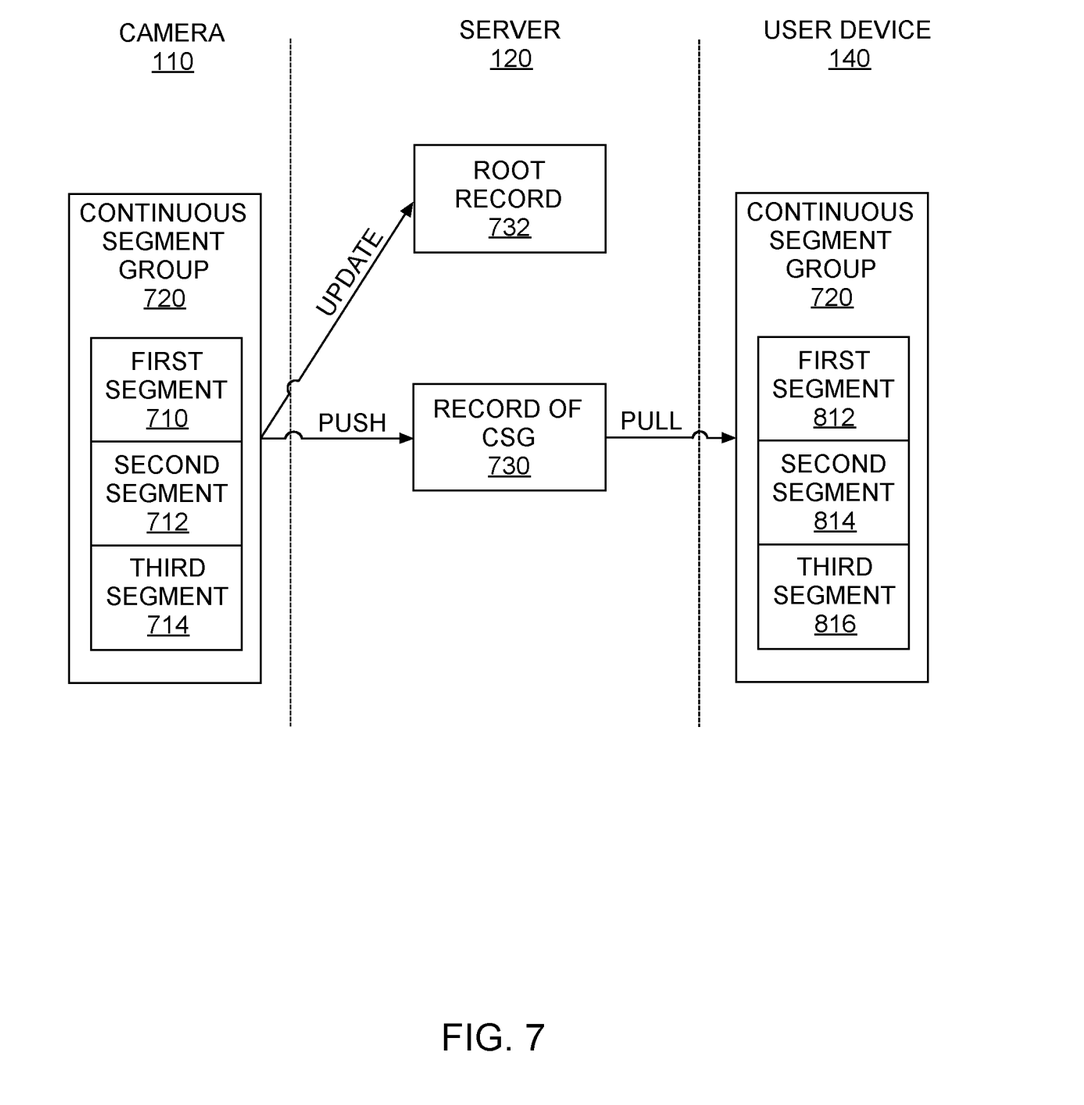
FIG. 7 depicts a flow diagram of a method for storing video data in a database according to example embodiments of the present disclosure.

FIG. 7 illustrates flow of data within the system 100 (FIG. 1) for streaming video according to example embodiments of the present disclosure. The camera 110 can be configured to parse video into plurality of segments, such as a first segment 710, a second segment 712, and a third segment 714. It should be appreciated that each segment 710, 712, 714 of the plurality of segments can include data indicative of a plurality of video frames.

As an example, the first segment 710, second segment 712, and third segment 714 can each correspond to video captured during 10 second intervals of time. For instance, the first segment 710 of the video can include a plurality of video frames captured from 9:00:00 AM to 9:00:10. The second segment 712 of the video can include a plurality of video frames captured from 9:00:11 to 9:00:20. The third segment 714 of the video can include a plurality of video frames captured from 9:00:21 to 9:00:30. Since the first segment 710, second segment 712, and third segment 714 occur one after the other without any intervening segments, the first segment 710, second segment 712, and third segment 714 can be collectively referred to as a continuous segment group720.

In some implementations, each segment of the continuous segment group 720 can be provided to the server 120 for storage. For instance, the continuous segment group 720 can be stored in a record 730 of a plurality of records associated with a database implemented by the server 120. In some implementations, the record 730 can be configured to accommodate a continuous segment group having 156 separate segments. It should be appreciated, however, that the record 730 can be configured to accommodate continuous segment groups having more or fewer segments.

Figure 8:
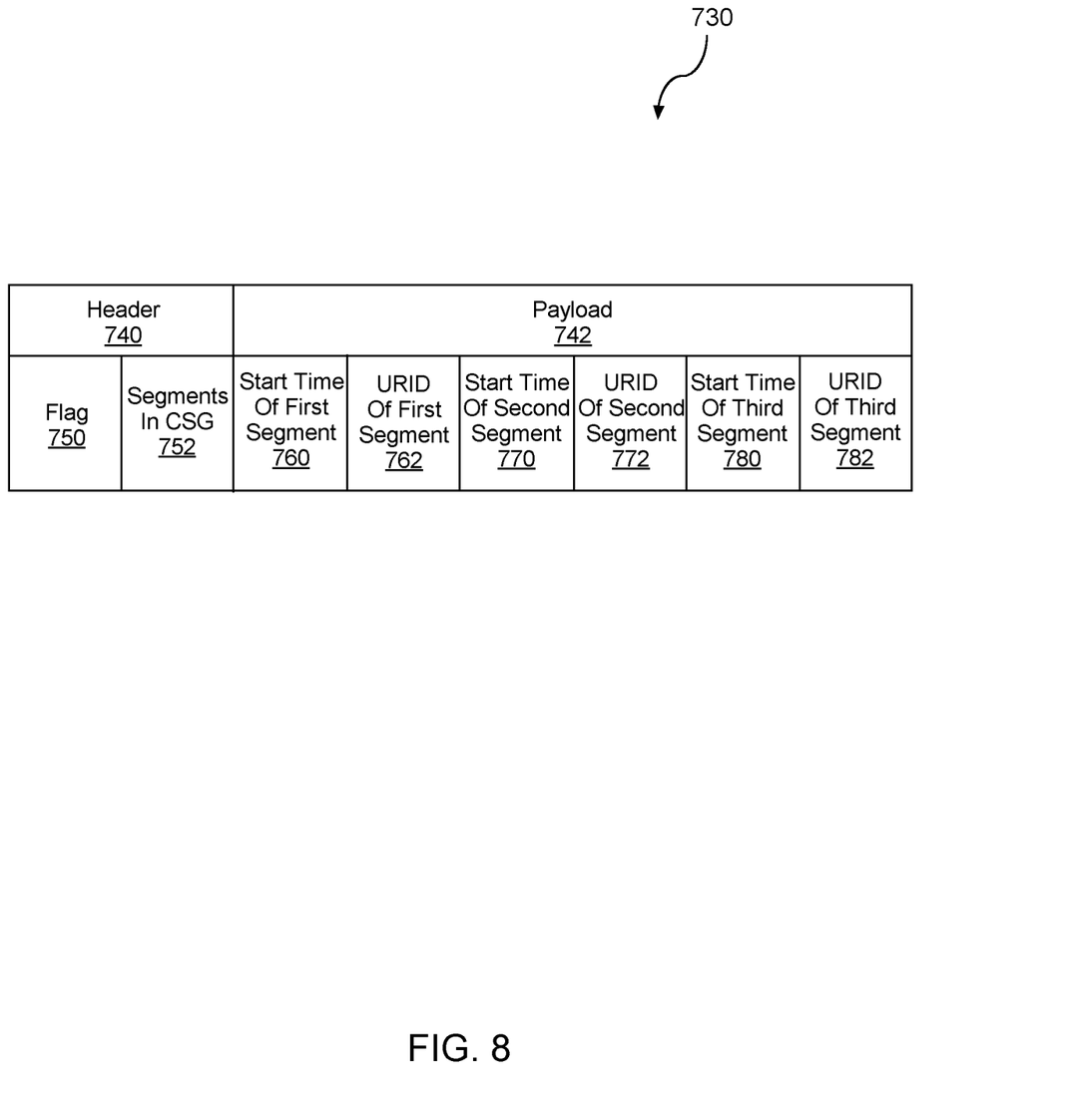
FIG. 8 depicts a record associated with a database according to example embodiments of the present disclosure.

Referring briefly now to FIG. 8, the record 730 can include a header 740 and a payload 742. As shown, the header 740 can include a flag 750. In some implementations, the one or more computing device 122 (FIG. 1) of the server 120 (FIG. 1) can adjust the flag 750 to indicate whether one of the segments included in the continuous segment group 720 corresponds to the most recent (e.g., live) segment of video captured by the camera 110. For instance, if the third segment 714 of the continuous segment group 720 corresponds to the most recent segment of video captured by the camera 110, the one or more computing devices 122 (FIG. 1) can set the flag 750 to have a first value. Otherwise, the one or more computing devices 122 can set the flag 750 to have a second value that is different than the first value and indicates the continuous segment group 720 does not include the most recent segment of video captured by the camera 110.

In some implementations, the header 740 can include data 752 indicative of the number of segments included in the continuous segment group 720 described by the record 730. As an example, since the continuous segment group 720 depicted in FIG. 7 only includes three separate segments, the data 752 would indicate that the continuous segment group 720 includes three separate segments (e.g., first segment 710, second segment 712, third segment 714). However, as discussed above, it should be appreciated that the record 730 can be configured to accommodate a continuous segment group having any suitable number of segments.

In some implementations, the payload 742 can include data indicative of a start time for each segment included in the continuous segment group. For instance, the record 730 can include data 760 indicative of the start time (e.g., 9:00:00 AM) of the first segment 710 (FIG. 7). In addition, the record 730 can include data 770 indicative of the start time (e.g., 9:00:11 AM) of the second segment 712 (FIG. 7). Still further, the record 730 can include data 780 indicative of the start time (e.g., 9:00:21 AM) of the third segment 714. In some implementations, the data 760, 770, 780 indicative of the start time of the first segment 710, second segment 712 and third segment 714, respectively, can be generated via the one or more computing devices 112 (FIG. 1) of the camera 110.

In some implementations, the record 730 can include data indicative of an end time for each segment included in the continuous segment group. For instance, the record can include data indicative of the end time (e.g., 9:00:10 AM) of the first segment 710, data indicative of the end time (e.g., 9:00:20 AM) of the second segment 712, and data indicative of the end time (e.g., 9:00:30 AM) of the third segment 714. In some implementations, the data indicative of the end time of the first segment 710, second segment 712 and third segment 714, respectively, can be generated via the one or more computing devices 112 (FIG. 1) of the camera 110.

In some implementations, the record 730 can include data indicative of a unique record identification (URID) of a record associated with each segment included in the continuous segment group 720. For instance, the record 730 can include data 762 indicative of the URID of a record associated with the first segment 710 of the continuous segment group 720. In addition, the record 730 can include data 772 indicative of the URID of a record associated with the second segment 712 of the continuous segment group 720. Still further, the record 730 can include data 782 indicative of the URID of a record associated with the third segment 714 of the continuous segment group 720.

In some implementations, the one or more computing devices 122 can be configured to implement a hash table to map a key (e.g., first segment 710, second segment 712, third segment 714, etc.) to a value (e.g., URID of first segment 710, URID of second segment 712, URID of third segment 716). For instance, the first segment 710 may be assigned a key value of 101, the second segment 712 may be assigned a key value of 102, and the third segment 714 may be assigned a key value of 103. In this manner, the key values for the segments 710, 712, 714 can be sequential. Additionally, the first segment 710, second segment 712, and third segment 714 may be stored in the database such that the segments 710, 712, 714 are physically close(e.g., stored in adjacent memory locations of the database) to one another within the database. In this manner, the database can be search in a more efficient manner when the user device 140 demands playback of the video or at least a portion thereof.

Figure 9:
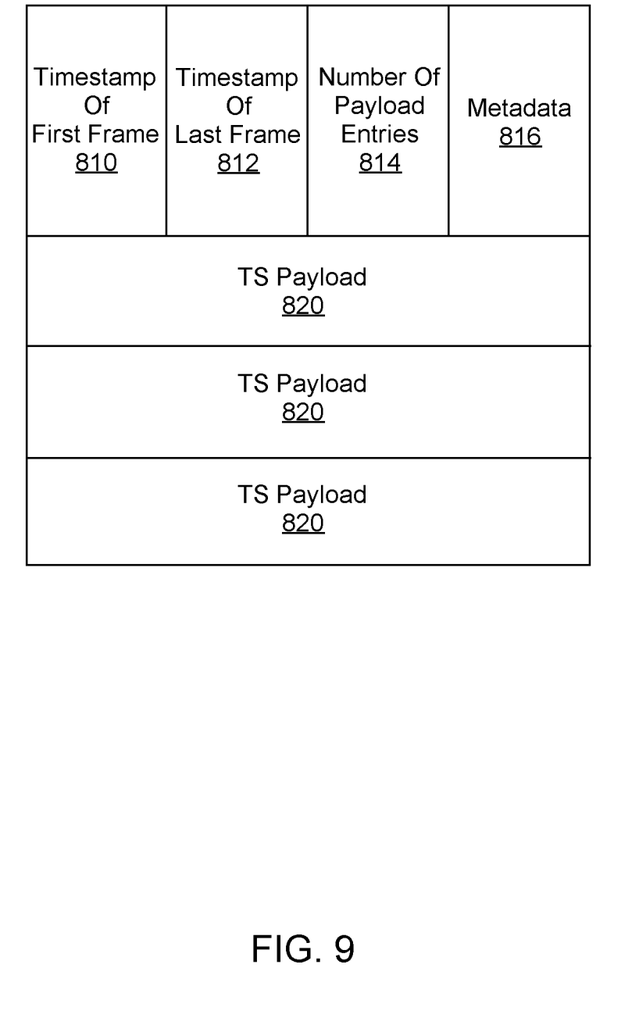
FIG. 9 depicts a record associated with a database according to example embodiments of the present disclosure.

Referring briefly to FIG. 9, an example record 800 associated with the first segment 710 of the continuous segment group 720 (FIG. 7) is provided according to example embodiments of the present disclosure. As shown, the record 800 can include a data field 810 indicative of a timestamp associated with the initial video frame of the first segment 710. The record 800 can further include a data field 812 indicative of a timestamp associated with the last video frame of the first segment 710. In some implementations, the record 800 can include a data field indicative 814 of the number of records associated with the first segment 710. For instance, the record 800 indicative of the first segment 710 can include a plurality of records 820 indicative of transport stream (TS) payloads included in the first segment 710 of the video captured by the camera 110 (FIG. 7).

It should be appreciated that the record 800 can include data field indicative of any suitable parameter. For instance, in some implementations, the record 800 can include a data field 816 indicative of metadata associated with the first segment 710. Also, although the record 800 of FIG. 9 is discussed with reference to the first segment 710 of the continuous segment group 720 (FIG. 7), it should be appreciated that records associated with the second segment 712 and third segment 714, respectively would be the same or similar to the record 800 associated with the first segment 710.

Referring again to FIG. 7, the one or more computing devices 122 (FIG. 1) of the server 120 can be configured to update a root record 732 of the database based, at least in part, on the record 730 of the continuous segment group 720. It should be appreciated that the root record 732 is updated each time a record is added to the database. In particular, the root record 732 is updated to indicate the URID (e.g., address) of the record that was just added. In this manner, the root record 732 can be accessed to identify the record indicative of a segment that was most recently added to the database. It should also be appreciated that the root record 732 is not subject to expiration. Thus, the root record 732 will remain even after the record 800 associated with the continuous segment group 720 has expired.

In some implementations, the user device 140 can demand playback of the video. For instance, the user device 140 can demand playback of the video starting from the first segment 710. As such, the one or more computing devices 122 (FIG. 1) of the server 120 can be configured to obtain the first segment 710 of the continuous segment group 720. In addition, the one or more computing devices 122 can be configured to obtain the second segment 712 of the continuous segment group 720 and the third segment 714 of the continuous segment group 720. In this manner, the video can be reconstructed and provided to the user device 104 for viewing.

Figure 10:
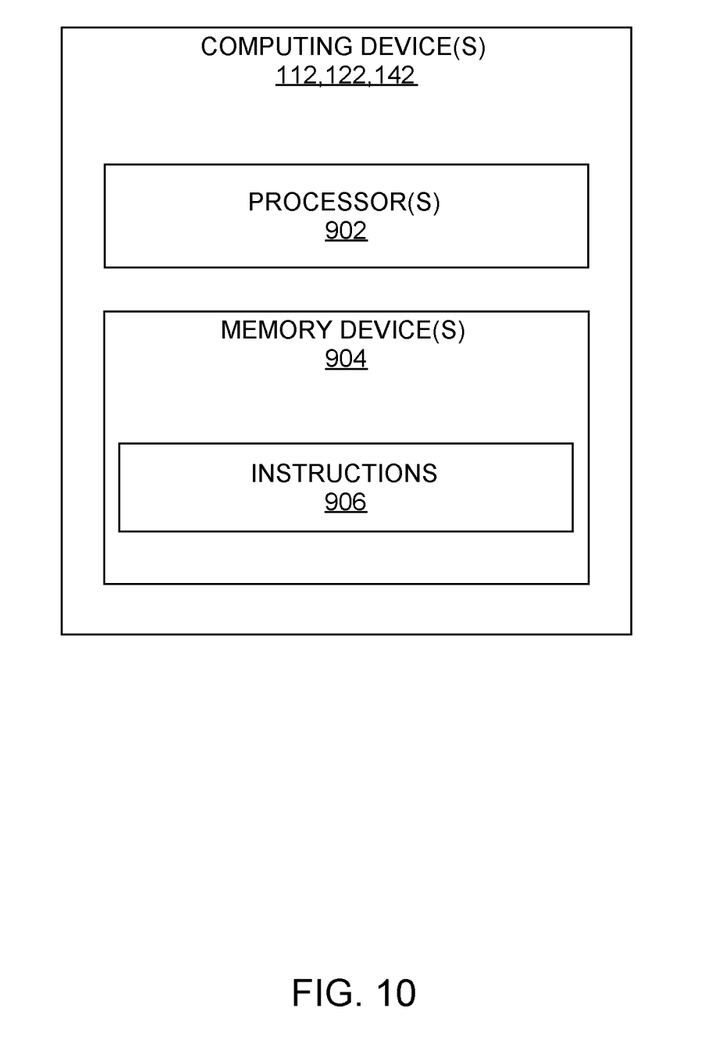
FIG. 10 depicts a block diagram of components of a computing device according to example embodiments of the present disclosure.

FIG. 10 illustrates one embodiment of suitable components of a computing device 112, 122, 142. As shown, the one or more computing devices 112, 122, 142 can include one or more processors 902 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, the one or more computing devices 112, 122, 142 can include a memory device 904. Examples of the memory device 904 can include computer-readable media including, but not limited to, non-transitory computer-readable media, such as RAM, ROM, hard drives, flash drives, or other suitable memory devices. The memory device 234 can store information accessible by the processor(s) 902, including computer-readable instructions 906 that can be executed by the processor(s) 902. The computer-readable instructions 906 can be any set of instructions that, when executed by the processor(s) 902, cause the processor(s) 902 to perform operations. The computer-readable instructions 906 can be software written in any suitable programming language or can be implemented in hardware.

In some implementations, the computer-readable instructions 906 can be executed by the processor(s) 902 to perform operations. For instance, the one or more computing devices 122 of the server 120 (FIG. 1) can be configured to perform operations associated with storing data indicative of a segment of a video captured by a camera as a record in a database. The one or more computing devices 122 can be further configured to determine whether the record has expired based, at least in part, on a timestamp indicative of when the record was created. In this manner, the one or more computing devices 122 can overwrite the record with data indicative of another segment of the video captured by the camera.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of storing segmented video in a database, the method comprising:
    capturing, via one or more cameras, video data;
    identifying, via one or more computing devices associated with a server, a camera as a source of the video data, based on a cloud storage identification of the camera, the camera being one of the one or more cameras;
    issuing, via the one or more computing devices, a token to the camera to authenticate communication between the camera and the one or more computing devices;
    obtaining, from the camera, via the one or more computing devices, data indicative of a at least one segment of the video data from the video data, and a cloud record key including a unique record identification identifying a location within a database associated with the server;
    storing, in the database, via the one or more computing devices based on the identifying of the camera and the issuing of the token, the data indicative of the at least one segment of the video data as a timestamped record, and data indicative of the unique record identification;
    determining, via the one or more computing devices, the record has expired based, at least in part, on a timestamp of the timestamped record indicative of when the record was created; and
    responsive to determining the record has expired, modifying, via the one or more computing devices, the record.

2. The method of claim 1, wherein the record includes a data field indicative of whether the record is overwritable.

3. The method of claim 2, wherein when the data field indicates the record is overwritable, modifying the record comprises:
    overwriting, via the one or computing devices, the record with data indicative of another segment of the video data.

4. The method of claim 1, wherein the data indicative of the at least one segment of the video data includes a first segment having a first plurality of video frames captured by the camera and a second segment having a second plurality of video frames captured by the camera.

5. The method of any claim 4, wherein the record includes:
    a first frame timestamp associated with the first segment; and
    a second frame timestamp associated with the second segment.

6. The method of claim 1, wherein obtaining data indicative of the at least one segment of the video data captured by a camera comprises:
    obtaining, via the one or more computing devices, data indicative of a first plurality of video segments captured by the camera;
    obtaining, via the one or more computing devices, data indicative of a second plurality of video segments captured by the camera;
    combining the first plurality of video segments into a first segment group; and
    combining the second plurality of video segments into a second segment group.

7. The method of claim 6, further comprising:
    storing, via the one or more computing devices, the first segment group as a first record in the database; and
    storing, via the one or more computing devices, the second segment group as a second record in the database.

8. The method of claim 7, wherein the first record includes:
    a data field indicative of the number of segments included in the continuous segment group; and
    a data field indicative of the record identifying each of the segments included in the first segment group.

9. The method of claim 1, wherein the database comprises a key-value database.

10. The method of claim 1, wherein the cloud storage identification of the camera includes a hash value determined based, at least in part, on a human-readable code assigned to the camera.

11. The method of claim 9, wherein storing the data indicative of the segment comprises:
    storing, via the one or more computing devices, the data indicative of the segment at a location within the database based, at least in part, on a key value associated with the segment.

12. A system for storing segmented video data in a database, the system comprising:
    a camera configured to capture a video and configured to generate a cloud storage identification based at least in part on a human-readable content name assigned to the camera via a user; and
    one or more computing devices communicatively coupled to the camera, the one or more computing devices configured to perform operations, comprising:
        identifying the camera as a source of the video based on the cloud storage identification;

issuing a token to the camera to authenticate communication between the camera and the one or more computing devices;

obtaining, from the camera, data indicative of a segment of the video, and a cloud record key including a unique record identification identifying a location within the database;

storing, in the database, based on the identifying of the camera and the issuing of the token, the data indicative of the segment of the video as a timestamped record, and data indicative of the unique record identification;

determining the record has expired based, at least in part, on a timestamp of the timestamped record indicative of when the record was created; and responsive to determining the record has expired, modifying the record.

13. The system of claim 12, wherein the record includes a data field indicative of whether the record is overwritable.

14. The system of claim 13, wherein when the data field indicates the record is overwritable, the operation of modifying the record comprises:

overwriting the record with data indicative of another segment of the video.

15. The system of claim 12, wherein the data indicative of the segment includes a plurality of video frames captured by the camera.

16. The system of claim 15, wherein the record includes:

a first timestamp associated with an initial video frame of the segment; and a second timestamp associated with the last video frame of the segment.

17. The system of claim 12, wherein the operation of obtaining data indicative of a segment of a video captured by a camera comprises:

obtaining data indicative of a first segment of the video captured by the camera;

obtaining data indicative of a second segment of the video captured by the camera; and obtaining data indicative of a third segment of the video captured by the camera, wherein the first segment, second segment, and third segment form a continuous segment group.

18. The system of claim 17, wherein the operation of storing the data indicative of the segment as a record in the database comprises:

storing data indicative of the continuous segment group as a record in the database;

storing data indicative of the first segment as a record in the database;

storing data indicative of the second segment as a record in the database; and storing data indicative of the third segment as a record in the database.

19. The system of claim 18, wherein the record indicative of the continuous segment group includes:

a data field indicative of the number of segments included in the continuous segment group; and a data field indicative of the record identifying the first segment included in the continuous segment group.

20. A non-transitory computer readable medium comprising computer readable instructions for carrying out a method for storing segmented video in a database, the method comprising:

capturing, via one or more cameras, video data;

identifying, via one or more computing devices, a camera as a source of the video data, based on a cloud storage identification of the camera, the camera being one of the one or more cameras;

issuing, via the one or more computing devices, a token to the camera to authenticate communication between the camera and the one or more computing devices;

obtaining, from the camera, via the one or more computing devices associated with a server, data indicative of a segment of the video data from the video data, and a cloud record key including a unique record identification identifying a location within a database associated with the server;

storing, in the database, via the one or more computing devices based on the identifying of the camera and the issuing of the token, the data indicative of the segment of the video data as a timestamped record, and data indicative of the unique record identification;

determining, via the one or more computing devices, the record has expired based, at least in part, on a timestamp of the timestamped record indicative of when the record was created; and responsive to determining the record has expired, modifying, via the one or more computing devices, the record.

* * * * *